Sept. 1, 1953     A. G. SKAGGS     2,650,462
MOISTENING DEVICE FOR COTTON HARVESTERS
Filed June 29, 1951     3 Sheets-Sheet 1
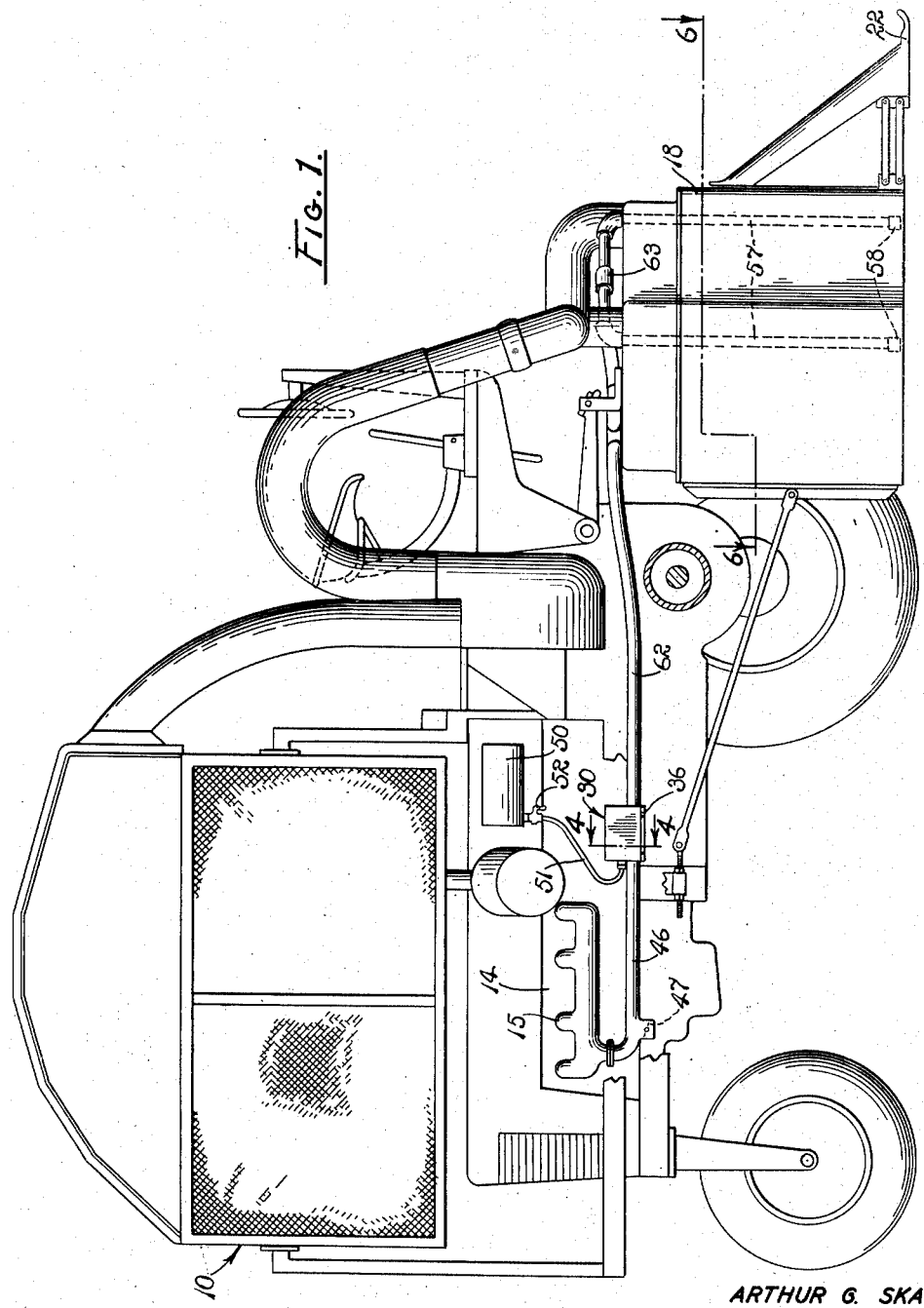
ARTHUR G. SKAGGS
INVENTOR
HUEBNER, BEEHLER,
WORREL & HERZIG
ATTORNEYS Sept. 1, 1953 A. G. SKAGGS 2,650,462
MOISTENING DEVICE FOR COTTON HARVESTERS
Filed June 29, 1951 3 Sheets-Sheet 2
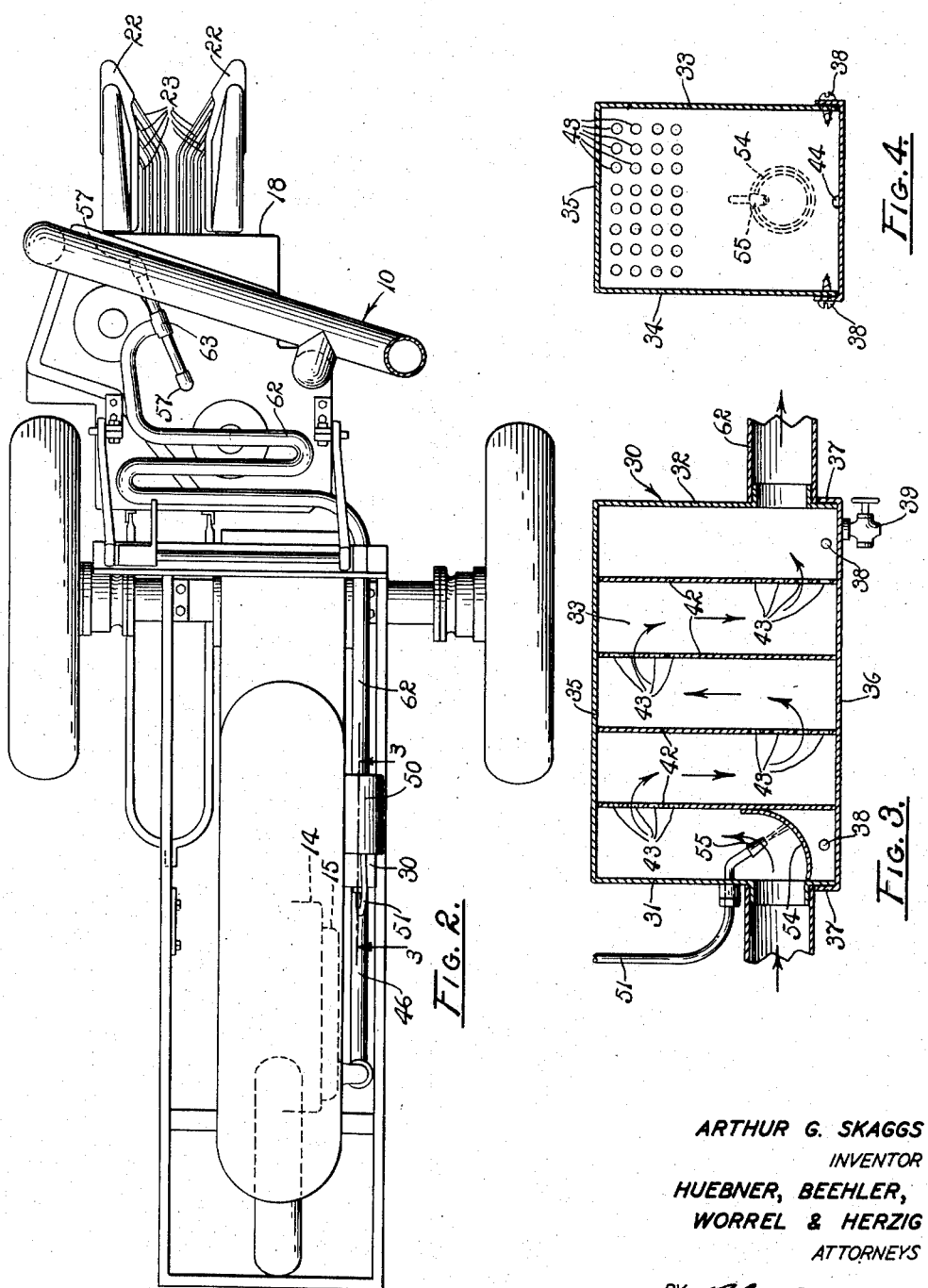
ARTHUR G. SKAGGS
INVENTOR
HUEBNER, BEEHLER,
WORREL & HERZIG
ATTORNEYS Sept. 1, 1953 A. G. SKAGGS 2,650,462
MOISTENING DEVICE FOR COTTON HARVESTERS
Filed June 29, 1951 3 Sheets-Sheet 3
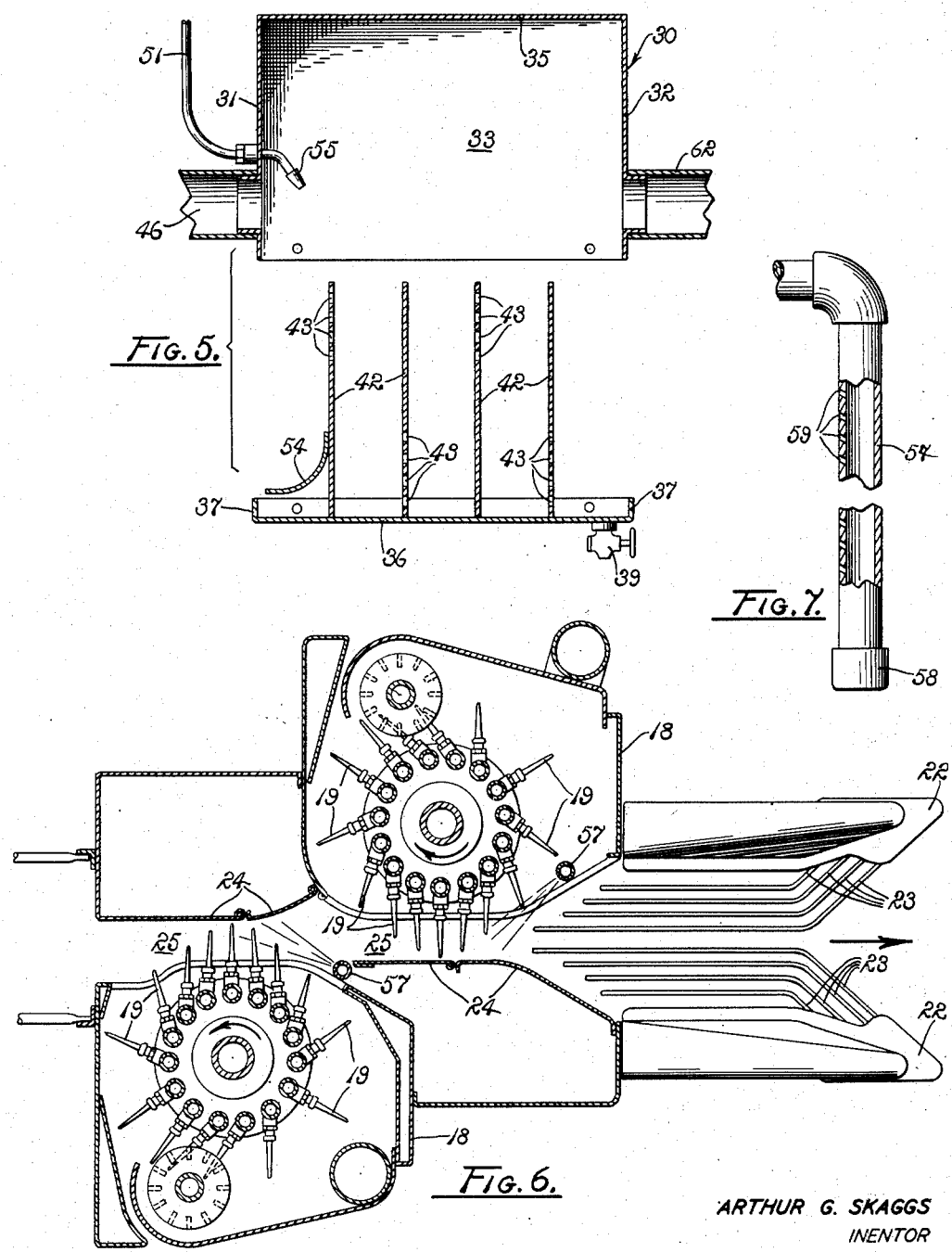
ARTHUR G. SKAGGS
INVENTOR
HUEBNER, BEEHLER,
WORREL & HERZIG
ATTORNEYS Patented Sept. 1, 1953

2,650,462

UNITED STATES PATENT OFFICE 2,650,462

MOISTENING DEVICE FOR COTTON HARVESTERS

Arthur G. Skaggs, Fresno, Calif., assignor of one-half to Arsen M. Kuyudjian, Fresno, Calif.

Application June 29, 1951, Serial No. 234,417

9 Claims. (Cl. 56—14)

1

The present invention relates to cotton harvesters and more particularly to a moistening device therefor directed to the improvement of cotton picking efficiency.

Cotton harvesters usually employ plant compressors arranged to define a path of travel therethrough for cotton plants which the harvester is caused to traverse during operation. It is the usual practice in mechanical cotton pickers to mount picker spindles for rotational movement and successive travel through a picking area in the plant path.

It was long ago discovered that the application of minute quantities of water to the picker spindles increases their affinity for cotton fibers and thus the picking efficiency thereof without substantially increasing the difficulty of removing cotton bolls from the spindles by doffer mechanisms.

Even though the quantities of water conventionally administered to the spindles are small, the repetitious picking action requires an undesirably bulky reservoir for the water. The water is usually delivered from such reservoirs in moisture-applicator-tubes which serve to moisten pad-like applicators that impart the moisture to the spindles immediately prior to their cotton picking operation. Inasmuch as cotton is harvested in the fall of the year frequently when the environmental temperature is below freezing, the water in the tubes not infrequently freezes, precluding effective cotton harvester operation and rupturing the tubes requiring repair operations of considerable expense and inconvenience.

An object of the present invention is to provide an improved moistening device adapted to discharge water vapor into the picking zone of a cotton harvester for condensation on the cotton and on picking mechanisms of the harvester immediately prior to the picking operation.

Another object is to eliminate the conventional requirement for objectionably bulky storage tanks or reservoirs for spindle wetting agents in cotton harvesters.

Another object is to eliminate the difficulties incident to the freezing of spindle moistening agents in conventional cotton harvesters.

Another object is to simplify moistening devices in cotton harvesters by administering the moisture by condensation as distinguished for previously required mechanical application.

Another object is to utilize the water of combustion of internal combustion engines employed to drive cotton harvesters in the moistening of

2 picking mechanisms and/or cotton preliminary to the picking operation.

Another object is to provide means for utilizing the exhaust heat of an internal combustion engine to vaporize regulated quantities of supplemental water for discharge with the water of combustion of the exhaust into the picking zone of cotton harvesters.

Other objects are to provide improved elements and arrangements thereof in a device of the character and for the purposes set forth that is economical to construct, dependable in operation and fully effective in accomplishing its intended purposes.

Other objects and advantages will become apparent in the subsequent description in the specification.

In the drawings:

Fig. 1 is a side elevation of a conventional cotton harvester illustrating the incorporation of a moistening device embodying the principles of the present invention therein, the harvester having a forward support wheel removed for illustrative convenience.

Fig. 2 is a plan view of the harvester shown in Fig. 1.

Fig. 3 is an enlarged vertical section taken on line 3—3 of Fig. 2 illustrating internal details of a spark arrester employed in the subject invention.

Fig. 4 is a vertical transverse section of the spark arrester taken on line 4—4 of Fig. 1.

Fig. 5 is a section of the spark arrester similar to Fig. 3 but showing a bottom portion and baffle plates thereof removed for cleaning convenience.

Fig. 6 is a fragmentary, enlarged, horizontal section of the arrester and moistening device, as taken on line 6—6 of Fig. 1.

Fig. 7 is a foreshortened elevation of a moistening head employed in the subject invention having a portion thereof removed to illustrate the positioning of exhaust ports therein.

Referring in greater detail to the drawings:

A conventional cotton harvester is indicated generally at 10 exemplifying harvesters generally with which the device of the present invention may be employed. In this connection it is appropriate to observe that the moistening of picking mechanisms generally aids in the affinity of fibers therefor and the present invention is of course not limited to its application to cotton harvesters although illustrated in connection therewith.

Inasmuch as the structure of the cotton harvester 10 is well known, reference is made herein to only such specific elements thereof as is believed conducive to a ready understanding of the subject invention. The cotton harvester utilizes an internal combustion engine 14 which serves to motivate the harvester in earth traversing movement and supplies power for a picking mechanism. The engine has a manifold or exhaust collector 15 mounted thereon.

At the forward end of the harvester 10, a pair of laterally spaced picking heads 18 are mounted for elevational adjustment in response to terrain traversed. A plurality of elongated picking spindles 19 are mounted for horizontal rotational travel in each of the picking heads 18 and are rotatably driven about their respective longitudinal axes.

A shoe 22 is forwardly extended from each of the picking heads 18 and serves to pass under encountered cotton plants as the harvester is driven along a row thereof. A plurality of guide fingers 23 are mounted on each of the shoes and upwardly and rearwardly extended therefrom to lift branches of the cotton plants and to confine them to a narrow channel or plant path through the harvester. Plant compressors 24 are mounted in association with each of the picking heads so as to define picking zones 25 through which the spindles are traveled and in which the plants are compressed to a narrow, vertical layer. The structure described is essentially conventional and characterizes a suitable operational environment for the device of the present invention.

A spark arrester 30 is mounted on the cotton harvester adjacent to the engine 14. As shown in Figs. 3 to 5, the arrester provides a substantially rectangular housing having a forward end 31, a rearward end 32, an inner side 33, an outer side 34 and a top 35 fabricated from sheet metal or other suitable material. The ends and sides define a downwardly disposed rectangular open bottom which is closed by a pan 36 having upwardly turned edges slidably fitted to the ends and sides. Sheet metal screws 38 or other attaching devices are employed releasably to hold the pan securely against the lower edges of the ends and sides of the arrester. The pan is preferably slightly inclined for drainage and a petcock 39 mounted thereon to facilitate periodic draining, if required.

A plurality of rigid baffle plates 42 are mounted on the pan 36 in substantially erect parallel positions and slidably fitted between the sides 33 and 34 of the arrester. The forwardmost baffle plate has openings 43 formed therethrough adjacent to the top 34, the adjacent baffle plate openings 43 adjacent to the pan 36 and successive baffle plates provided with such openings alternately near the top 35 and pan 36. Small drainage bores 44 of adequate size to permit flow of any condensate liquid with the spark arrester through the baffle plates to the petcock 39 are provided in the plates adjacent to the pan.

A conduit 46 is connected to the manifold 15 and to the forward end 31 of the spark arrester 30 adjacent to the pan 36. A cutout 47 is normally provided in the conduit so that the exhaust can be discharged directly to the atmosphere if desired.

A small water tank 50 is mounted on the cotton harvester 10 in elevationally spaced relation to the spark arrester 30 and a feed tube 51 extended from the tank into the arrester immediately above the conduit 46. A control valve 52 is provided in the tube and serves to regulate fluid supply to the spark arrester or to block such flow completely when supplemental moisture is not wanted. As will become apparent, only extremely small quantities of water are required of the tank 50 which need not be as bulky as those normally employed to contain spindle wetting fluid. It is to be understood that any desired liquid may be utilized in the tank 50 for supply to the spark arrester.

Endwardly adjacent to the conduit 46 within the spark arrester 30, an arcuate deflector plate 54 is mounted to receive the full blast of exhaust discharged through the conduit. The tube 51 within the arrester is provided with an orifice 55 in a position to direct small quantities of water onto the deflector plate. In operation, the exhaust on the engine 14 heats the deflector plate 54 to a high temperature so that water or other liquid discharged onto the deflector plate is promptly vaporized for passage through the baffle plates 42. To minimize deterioration of the plate 54, it may be formed of ceramic or other oxidation resistant material.

A distributing head 57, of the type shown in Fig. 7, is mounted in a substantially erect position forwardly adjacent to the spindles 19. The distributing heads are conveniently formed from lengths of pipe of suitable size having a capped lower end portion 58 and providing a series of ports 59 through a side of the pipe in alignment longitudinally thereof. The ports are conveniently formed by simple boring operations and are preferably upwardly and outwardly directed into the picking zones of their respective spindles. A conduit 62 is connected to the forward end 31 of the spark arrester 30 and to each of the distributing heads 57.

It will be apparent that exhaust and vapor delivered to the distributing heads should travel substantially equal distances for equal fluid supply and equivalent delivery temperatures and pressures. To this end, a conduit 62 provides a T 63 midway between the distributing heads which is centrally connected to the conduit 46. Depending upon the heat of the exhaust from the engine 14, the distance from the manifold 15 to the distributing heads 57 and the temperature of the operational environment for the cotton harvester, it is sometimes desirable to increase the distance of travel between the spark arrester 30 and the distributing heads 57 for the exhaust and vapor. This may be accomplished as shown in Fig. 2 by flaking the conduit 62 in a series of return bends across the forward end of the harvester. It will be understood that it is desirable that the temperature of the exhaust be reduced approximately to the temperature of condensation of the moisture borne thereby at the point of discharge from the distributing heads 57. When the exhaust is sufficiently saturated and the delivery temperature properly controlled, the atmospheric temperature in the picking zones 25 causes the vapor to condense on the cotton, immediately preliminary to its picking, and/or to condense on the picking spindles 19.

*Operation*

The operation of the device of the present invention is believed to be clearly apparent and is briefly summarized at this point. The harvester 10 is operated in the usual manner by motivation in earth traversing movement by the engine 14 as an operator guides the harvester so as to cause a selected row of cotton plants to pass between the fingers 23 and compressors 24 through the picking zones 25. The picking heads 18 are driven in the usual way, not described. When the engine 14 has been operated for a brief period, the spark arrester 30 and particularly the deflector 54 becomes heated. If desired, a metered amount of water or other wetting fluid is discharged through the nozzle 55 onto the deflector plate where it is vaporized.

The exhaust is forced through the spark arrester 30 along the flow lines shown in Fig. 3 serving not only to cool and/or quench any sparks contained in the exhaust but also to cool the exhaust itself.

The exhaust is directed by the conduit 62 from the spark arrester 30 to each of the distributing heads 57 where it is discharged upwardly into the picking zones 25, as shown in Fig. 6. The upward direction of the exhaust tends to lift the cotton and cotton plants for picking efficiency and the condensation of water vapor on the cotton plants and spindles 19 incident to the reduction of the exhaust temperature provides ample moisture and desired affinity of the cotton for the spindles 19.

In many instances, it is not necessary to introduce water or other moistening fluid into the spark arrester from the tank 50. It is well known that a substantial quantity of water of combustion is formed by the burning of petroleum products of the type normally utilized in internal combustion engines. For most such petroleum fuels, approximately 145 pounds of water is formed by every 100 pounds of fuel consumed. During cold weather it has been found that the water of combustion is adequate to accomplish the desired cotton picking efficiency and no supplemental water need be admitted from the tank 50 to the arrester 30 through the valve 52.

In addition, it has been discovered that unburned constituents of the petroleum fuel and probably the carbon contained in the exhaust and perhaps even the carbon dioxide and carbon monoxide exercise a synergistic effect on the plant waxes normally encountered in cotton and the like which in conventional cotton harvesters tend to clog the spindles. Although it is not known what the precise action of the exhaust is in this particular or the component that achieves the dewaxing function, it is readily demonstrated and is not believed simply to be incident to the condensation of water vapor which is not in adequate quantity to exercise a washing action sufficient to explain the results achieved.

As previously suggested, if through improper control of the valve 52, water condenses in the spark arrester 30, it may readily be drained therefrom by opening the petcock 39. The spark arrester is periodically cleaned by removing the pan 36 therefrom with the baffle plates 42 and deflector plate 54 mounted on the pan.

The device of the present invention makes possible the utilization of the water of combustion of petroleum fuels in the internal combustion engines of cotton harvesters and provides for the convenient supplementing of the water of combustion by any suitable fluid employed in the tank 50. The efficiency of the spark arrester 30 in quenching sparks is increased by the vaporization of liquid therein discharged onto the deflector plate 54. The heat of the exhaust precludes the freezing of any of the described moistening systems so that even in the coldest weather those inconveniences incident to the freezing of moistening liquid are obviated. The device is economical to construct as an integral part of a cotton harvester or as an attachment therefor.

It is dependable in operation and fully effective in accomplishing the intended purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and systems.

Having described my invention, what I claim as new and desire to secure by Letters Patent is:

1. In a mechanical cotton picker adapted for earth traversing movement, the combination of a picking mechanism mounted in the picker, an internal combustion engine having driving connection to the picking mechanism and providing an exhaust collector, means mounted in the picker defining a path of movement of cotton plants through the picker past the picking mechanism, and conduit means having an end connected to the exhaust collector and an opposite end mounted in the path defining means open to the plant path forwardly of the picking mechanism.

2. In a mechanical cotton picker having rotatably driven picking spindles and an internal combustion engine having driving connection to the spindles provided with an exhaust collector, a moistening device comprising a ported distributing head mounted adjacent to the spindles, and conduit means interconnecting the exhaust collector and the distributing head for discharge of exhaust from the internal combustion engine therethrough.

3. In a mechanical cotton picker adapted for earth traversing movement having a pair of spaced picking heads each including rotated picking spindles, plant compressors mounted in the picker forwardly of the picking heads and positioned to receive cotton plants during earth traversing movement of the picker and defining a path adapted to direct the plants between the picking heads, and an internal combustion engine having motivating connection to the picker and driving connection to the picking heads provided with an exhaust collector; a moistening device comprising a pipe mounted in a substantially vertical position adjacent to each of the picking heads intermediate its respective head and the plant compressors, each of the pipes having ports directed into the plant path defined by the plant compressors, and a conduit interconnecting the exhaust collector and the ported pipes whereby the exhaust is directed into the plant path for condensation of water of combustion in the exhaust on plants passed therethrough.

4. In a mechanical cotton picker mounted for earth traversing movement, having a pair of spaced picking heads, provided with means mounted in the picker forwardly of the picking heads defining a path of movement of cotton plants through the picker between the picking heads during earth traversing movement of the picker, and having an internal combustion engine in driving connection to the picking heads including an exhaust collector; a moistening device comprising a distributing head mounted in the picker adjacent to the plant path in advance of each of the picking heads and provided with exhaust ports disposed toward the plant path, a spark arrester connected to the exhaust collector in sufficient proximity thereto to be heated by exhaust from the engine, means connected to the spark arrester for supplying liquid moistening agent in metered amounts to the spark arrester for vaporization therein, and a conduit interconnecting the spark arrester and the distributing heads for delivery of exhaust and vaporized liquid thereto for discharge onto plants passed through the picker.

5. In a mechanical cotton picker mounted for earth traversing movement and having a pair of spaced picking heads each including rotated picking spindles, plant compressors mounted in the picker forwardly of the picking heads and positioned to receive cotton plants during earth traversing movement of the picker and defining a path adapted to direct the plants between the picking heads, and an internal combustion engine having motivating connection to the picker and driving connection to the picking heads provided with an exhaust collector; a moistening device comprising a pipe mounted in a substantially vertical position adjacent to each of the picking heads intermediate its respective head and an adjacent plant compressor, each of the pipes having ports directed into the plant path defined by the plant compressors, a spark arrester connected to the exhaust collector in sufficient proximity thereto to be heated by exhaust gases passed therethrough, a fluid reservoir mounted in the picker, a fluid feed tube interconnecting the fluid reservoir and the spark arrester, valve means mounted in the feed tube whereby liquid flow from the reservoir to the arrester is adjustably regulated for vaporization of the liquid in the arrester by heat from the exhaust, and a conduit interconnecting the spark arrester and the ported pipes whereby the exhaust bearing vaporized liquid is directed into the plant path for condensation of the vaporized liquid and water of combustion in the exhaust on plants passed therethrough.

6. In a mechanical cotton harvester having a cotton picking mechanism and an internal combustion engine in driving connection with the picking mechanism provided with an exhaust collector, a moistening device comprising a ported distributing head mounted adjacent to the picking mechanism, a spark arrester, a conduit connecting the spark arrester to the exhaust collector of the engine, said spark arrester having a deflector plate mounted therein in alignment with the conduit whereby exhaust delivered thereto impinges on the deflector plate, a fluid reservoir, a tube interconnecting the reservoir and the spark arrester and arranged to discharge fluid from the reservoir onto the deflector plate, and a conduit interconnecting the spark arrester and the distributing head.

7. In a mechanical cotton picker having a picking mechanism and an internal combustion engine providing an exhaust collector, the combination of a distributing head mounted in the picker adjacent to the picking mechanism and having exhaust ports therein, and conduit means connected to the exhaust collector of the engine and to the distributing head.

8. In a mechanical cotton picker having a picking mechanism and an internal combustion engine providing an exhaust collector, the combination of a distributing head mounted in the picker adjacent to the picking mechanism and having exhaust ports therein, moisture adding means connected to the exhaust collector in sufficient proximity thereto to be heated by exhaust from the engine, a fluid reservoir, a control valve connected to the reservoir and to the moisture adding means adapted to regulate fluid flow from the reservoir to said means, and a conduit interconnecting the moisture adding means and the distributing head.

9. In a mechanical cotton picker mounted for earth traversing movement having a pair of spaced picking heads each including rotated picking spindles, plant compressors mounted in the picker in forwardly spaced relation to the picking heads and forwardly extended therefrom adapted to receive cotton plants therebetween during earth traversing movement of the picker and defining a path adapted to direct the plants between the picking heads, and an internal combustion engine having driving connection to the picking heads provided with an exhaust collector; a moistening device comprising a pipe mounted in a substantially vertical position intermediate each of the picking heads and the plant compressors having upwardly directed ports therein disposed toward the plant path defined by the plant compressors, a spark arrester connected to the exhaust collector having a deflector plate mounted therein in sufficient proximity to the exhaust collector to be heated by the exhaust gases passed therethrough, a fluid reservoir mounted in the picker above the spark arrester, a tube connected to the reservoir and to the spark arrester arranged to discharge fluid from the reservoir onto the deflector plate, and a conduit connected to the spark arrester and the ported pipes whereby the exhaust bearing fluid vaporized on the deflector plate is directed upwardly into the plant path in advance of the picking heads for condensation of the vaporized fluid and water of combustion in the exhaust on plants passed through the path.

ARTHUR G. SKAGGS.

References Cited in the file of this patent
UNITED STATES PATENTS

| Number | Name | Date |
|---|---|---|
| 2,558,851 | Hagen et al. | July 3, 1951 |